United States Patent Office 2,781,930
Patented Feb. 19, 1957

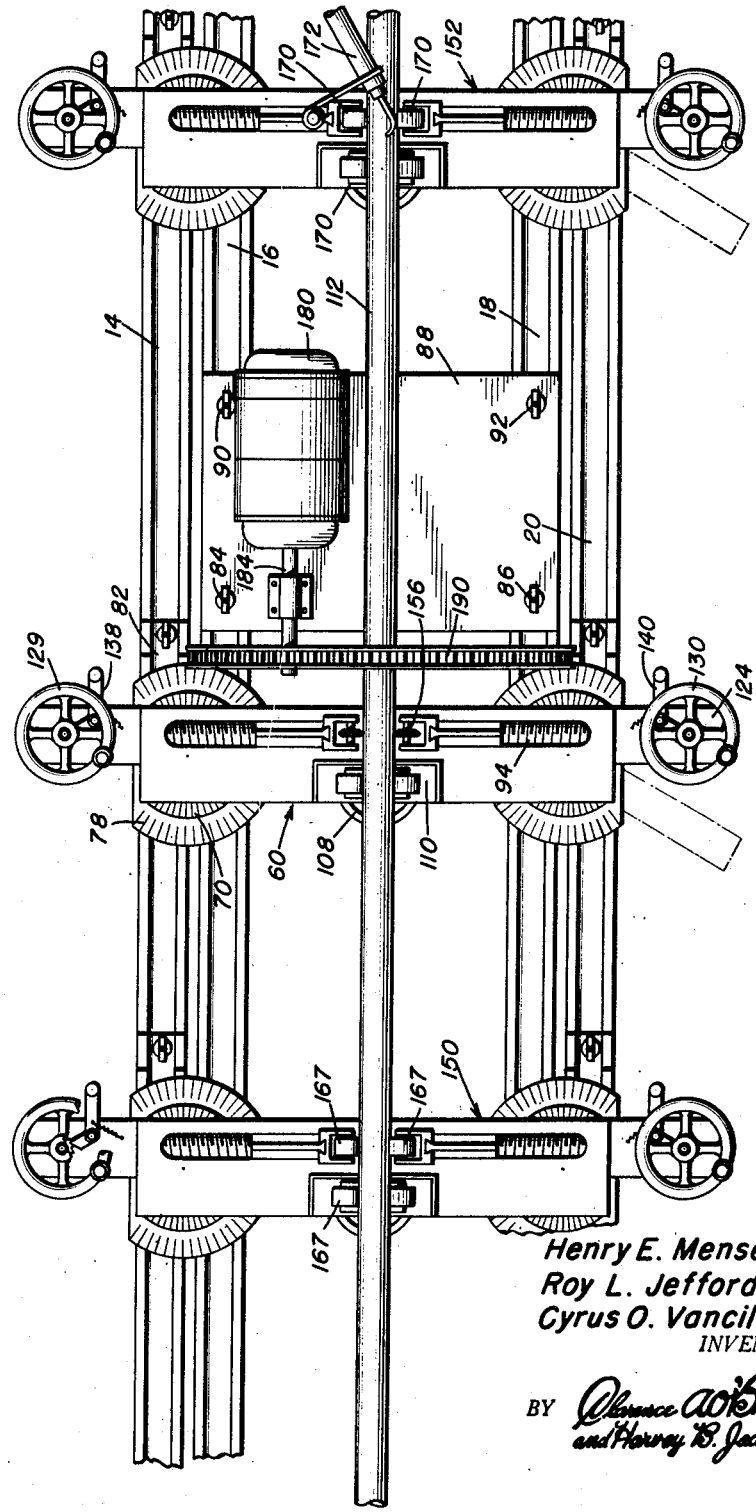

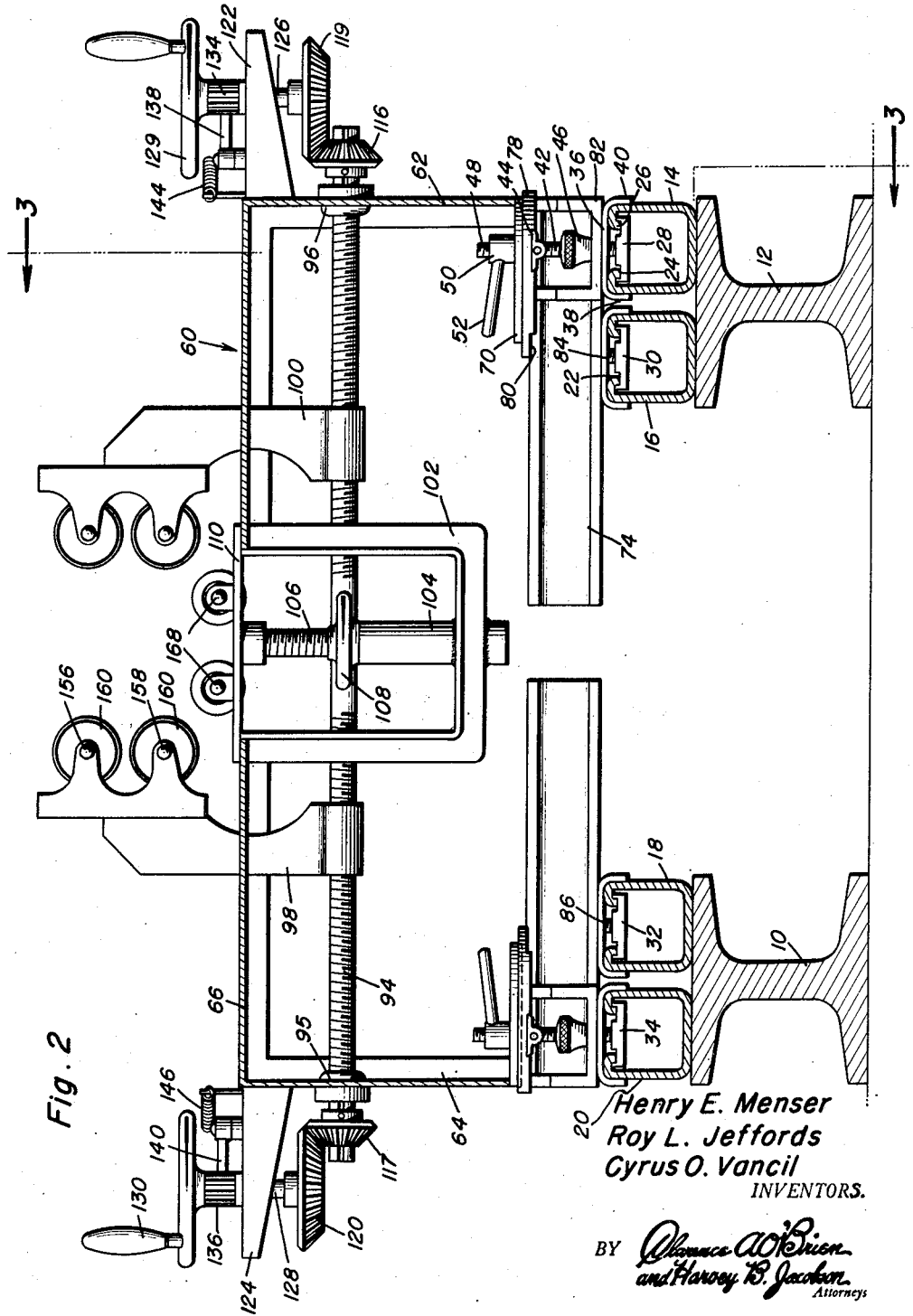

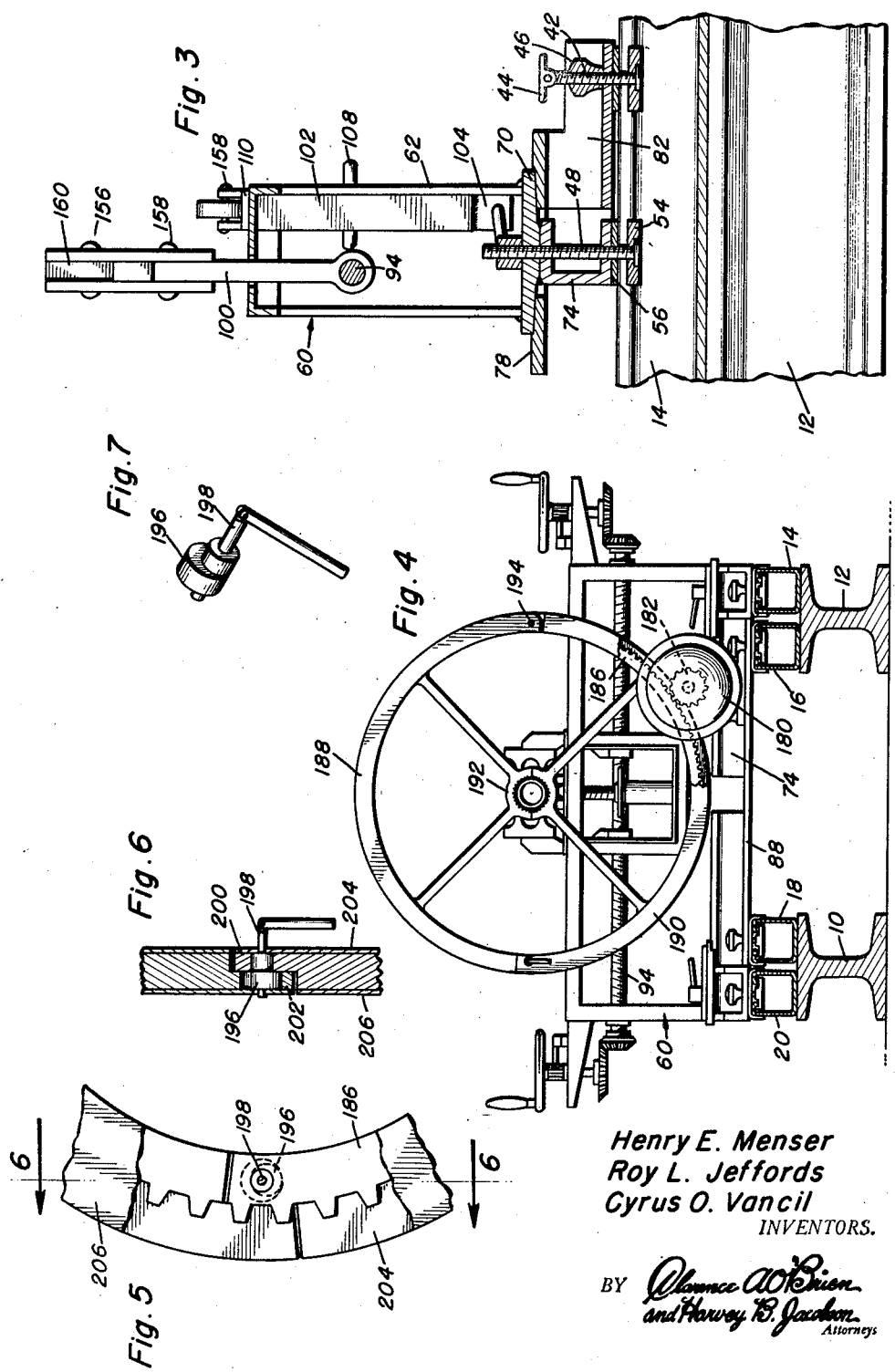

2,781,930

PIPE HANDLING APPARATUS

Henry E. Menser and Roy L. Jeffords, Princeton, and Cyrus O. Vancil, Paducah, Ky., assignors of one-fourth to Claude Anderson, Princeton, Ky.

Application August 9, 1955, Serial No. 527,285

5 Claims. (Cl. 214—340)

This invention relates to improvements in apparatus for handling pipe, especially larger, heavier pipe which is difficult to handle.

An object of this invention is to provide an apparatus for handling pipe, especially heavy soil pipe, cast iron water pipe, water mains and the like, whereby it may be cut, rolled, heated or held for various purposes including the attachment of laterals.

Another object of the invention is to provide a pipe handling apparatus as described above which is adjustable to align the pipe for proper junctions and which includes a number of structural refinements which make use of the apparatus easier and more accurate than any equipment of which we are aware at the present time.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary plan view of the pipe handling apparatus embodying the principles of the invention;

Figure 2 is a transverse sectional view of the apparatus of Figure 1;

Figure 3 is a fragmentary sectional view taken substantially on the line 3—3 of Figure 2 and in the direction of the arrows;

Figure 4 is a transverse sectional view of the apparatus of Figure 1;

Figure 5 is a fragmentary elevational view of a locking device suggested to be used in connection with the removable gear carried by the pipe through which the pipe is driven;

Figure 6 is a sectional view taken substantially on the line 6—6 of Figure 5; and Figure 7 is a perspective view of an eccentric constituting a part of the locking device of Figures 5 and 6.

In the accompanying drawings, there are suitable supports, such as I-beams 10 and 12, and the stationary rails are mounted thereon. The rails 14 and 16 are parallel to each other and located upon the upper surface of I-beam 12. Rails 18 and 20 are parallel and disposed on the I-beam 10. All of the rails are parallel to each other, and each is substantially U-shaped, opening upwardly and having an inwardly directed rib together with a downturned lip, the rib constituting a sliding support surface and the downturned lip being seated in upwardly opening recesses 22. The rail 14 has two longitudinal lips 24 and 26 located in recesses in the sliding block 28. Rail 16 is similarly connected with sliding block 30, while rails 18 and 20 are similarly connected with sliding blocks 32 and 34. A horizontal bearing plate 36 having downturned skirts 38 and 40 is disposed on the inwardly directed flanges of rail 14, and has a screw 42 (Figure 3) passed through the center of it. This screw has a pivoted handle 44 at the upper end thereof, and the lower end has a head countersunk in the sliding block 28. Knurled nut 46 is disposed on the shank of the screw 42 and is used to lock the screw in place. Directly behind the screw 42, there is a screw 48 on which nut 50 is disposed, this nut having a handle 52 projecting laterally therefrom for manually rotating it on screw 48. The lower end of screw 48 is countersunk in an aperture in sliding block 54, the latter being disposed in sliding contact with the lips 24 and 26 of rail 14. Plate 56 which is identical to plate 36, is mounted on the horizontal inwardly extending flanges of rail 14 and is slidable thereon.

A generally rectangular frame 60 is disposed on and operatively connected with the outer rails 14 and 20. This frame has two sides 62 and 64 together with a horizontal top 66. The lower ends of each side are welded or otherwise fixed to the top stationary plate of a protractor. For this construction, see Figure 3 and Figure 2 where the relationship is illustrated. For the side 62, upper protractor plate 70 is welded to the bottom thereof and is disposed upon a support arm 74 that is preferably channel-shaped. This arm also seats upon the sliding plate 56. Lower protractor plate 78 is relieved on its lower surface (Figure 2) as at 80 to accommodate the support arm 74 and to rotate with the adjustment of support arm 74. Protractor plate 78 is mounted on bracket 82, the latter being apertured so as to accommodate the screw 42. Accordingly, for the frame 60 which extends transversely across the plurality of rails, the mounting on each end consists of the screws, as those at 42 and 48 in Figure 3, together with their associated structure. The mounting means for each side of the frame 60 are identical. The sliding block 30 has a screw 84 connected to it, with the shank of the screw rising vertically upwardly. Sliding block 32 has a screw 86 rising therefrom with the shank also extending upwardly. As seen in Figure 1, a motor mount plate 88 has screws 84 and 86 passed through it, and there are screws 90 and 92 which also pass through openings in plate 88. Screws 90 and 92 are provided with sliding blocks and upper plates to form constructions identical to those shown for the screws 84 and 86 in Figure 2. By tightening the nuts on the screws 84, 86, 90 and 92, plate 88 may be adjusted to a selected position on the inner rails 18 and 16 and locked in place.

A screw 94 extending transversely across the frame 60 and passed through bearings 95 and 96 in the ends 64 and 62, respectively, is provided with reverse threads. The left hand threads at one end accommodate the threaded boss of a tool holder 98, while the right hand threads accommodate the threaded boss of a tool holder 100 so that in response to rotation of the shaft 94 in one direction, the tool holders 98 and 100 will be either brought together or spread apart, depending upon the direction of rotation. A generally U-shaped support 102 depends from the top 66 of frame 60, and is located at the center thereof. This support accommodates a vertical tube 104 in the open top of which there is a screw 106 having the threaded hand wheel 108 thereon. Platform 110 is secured to the screw 106. Inasmuch as the hand wheel 108 rests upon the open upper end of the tube 104, rotation of the hand wheel will raise and lower the screw 106, and hence, the platform 110. Platform 110 functions as a tool holder as do holders 98 and 100. They form a nest within which to accommodate a pipe, for example, the pipe 112 of Figure 1.

Means for rotating the screw 94 are provided on each side of the rails. Preferably, screw 94 is fitted with pinions 116 and 117 at each end, these pinions being enmeshed with gears 119 and 120 that are supported in laterally extending plates 122 and 124, respectively. These plates are welded or otherwise fixed to the frame 60 near the upper corners thereof, and have spindles 126 and 128 mounted therein. Hand wheels 129 and 130, respectively, are secured to the upper ends of the spindles in order to rotate the latter, and latch means are provided for each spindle 126 and 128. The preferred latch means consist of ratchet 134 on spindle 126 and ratchet 136 on spindle 128. A pivoted dog 138 is carried by the platform 122, while pivoted dog 140 is carried by the platform 124. Suitable biasing means, as springs 144 and 146, are connected to the dogs and to frame 60 in order to constantly bias the dogs into engagement with the ratchets 134 and 136. This forms a positive latch which has to be consciously opened in order to readjust the setting of tool holders 98 and 100 once they have been set.

In addition to frame 60, the pipe handling apparatus may be used with frames 150 and 152 which are constructed identically to frame 60. Any number of such transverse frames within the realm of practicality may be used in practice of the invention.

One of the features of the invention is that holders 98 and 100 together with holder 110 are fitted with pins, for example, the pins 156 and 158 on holder 98, so that the object retained therein may be removed in favor of a different object to serve a different purpose. To demonstrate the versatility of holders 98, 100 and 110, cutting wheels 160 are removably mounted on the pins appertinent thereto. The frame 150 has its pins fitted with rollers 167, as are the pins 168 of the holder 110. Frame 152 has rollers 170, and this frame is designed to accommodate a torch 172, the latter being held in place by a suitable bracket. The torch may be used for the various purposes desired by the operator of the device, such as in cutting pipe, making hot welds or other heating and cutting functions.

In order to rotate the pipe 112, the motor 180 is energized, this motor being carried by the motor supporting plate 88. Pinion 182 is carried by the end of the motor shaft 184, and this pinion is adapted to mesh with the gear 186, the latter being of special construction. Gear 186 is made in two sections 188 and 190. For large diameter pipes, the hub 192 of the gear 186 is made larger than that shown in Figure 4, and for smaller diameter pipes, the hub portion 192 is made smaller. The inner surfaces of the hub 192 are serrated in order to grip the outer surface of the pipe firmly.

Section 188 of the gear 186 is pivoted, as at 194, to the section 190. An eccentric 196 on shaft 198 is used to lock the opposite ends of the gear sections 188 and 190 together. As seen in Figure 6, the ends 200 and 202 of sections 188 and 190 are relieved so that they overlap, and the eccentric 196 is operable in an opening in the relieved portion 202.

In order that the motor mounting plate 88 may be slid with the pipe 112, plates 204 and 206 respectively are fixed to the faces of the gear 186, and the pinion 182 is located between these plates. Accordingly, when the motor supporting plate 88 is moved in one direction or the other, the thrust is transmitted to the pipe 112 through the two gears with the plates 202 and 206 preventing the pinion from becoming separated from the teeth of gear 186.

In use of the apparatus, the supporting arms 74, there being two provided at the ends of each frame 60, 150 and 152, are adapted to support pipe laterals for alignment with the bells or openings in pipe 112 or some other pipe. The handles, for example, handle 52 in Figure 2, are rotated, thereby loosening the assembly thereunder allowing the arm 74 to be swung outwardly, as shown in phantom in Figure 1. Then, when the arm 74 is moved the desired amount, as measured on the protractor, the nut 50 is tightened. A branch or lateral pipe may then be held in place by mounting a support on the arm 74 and welding or otherwise making the junction.

In instances where no laterals are to be attached, the arms 74 will not be used.

As shown in Figure 1, pipe 112 is in condition to be cut by the cutting wheels 156. By drawing the holders 98 and 100 tightly against the pipe 112 and energizing motor 180, the motor through the gearing on pipe 112 will cause the pipe to rotate and be cut by the cutting wheels. As an alternative, the pipe could have been cut by the torch 172 on frame 152. Moreover, the presence of the torch 172 provides a versatility in that it may be used for making hot welds, as needed in joining sewer tile.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a pipe handling apparatus having a plurality of spaced parallel rails and a pair of carriages mounted on said rails, a pair of horizontally adjustable holders carried by each carriage, means operatively connected with each holder for adjustment thereof on said carriages, means to latch said holder adjusting means in selected positions, and means movably disposed on said rails for rotating the pipe, said pipe rotating means including a third carriage, a motor carried by said third carriage, a first gear adapted to be attached to the pipe, a second gear enmeshed therewith and driven by said motor, and means including a flange extending across the ends of the teeth of one of said gears to prevent said gears from becoming separated in response to relative movement in a plane parallel to the axes of rotation of each of said gears.

2. In a pipe handling apparatus, a plurality of spaced parallel rails, a pair of carriages mounted on said rails, a pair of adjustable holders carried by each carriage, means operatively connected with each holder for adjustment thereof on said carriages, means movably disposed on said rails for rotating the pipe including a motor, a gear driven by said motor, a gear removably secured to said pipe and meshed with the first mentioned gear, a flange on one of said gears contacting a side of the other of said gears so that lateral movement of one gear with respect to the other causes said gears to move as a unit.

3. A pipe handling apparatus comprising a pair of spaced parallel rails, a frame mounted on said rails, a transverse screw carried by said frame, holders disposed on and carried by said screw and movable in response to rotation of said screw toward and away from each other in order to form a nest for a pipe therebetween, vertically adjustable means carried by said frame coacting with said holders and constituting an additional holder for the pipe, means to removably support pipe contacting devices in said holders, and means operatively connected with said screw for locking said screw in selected positions, means for rotating the pipe, said pipe rotating means including a gear made of a pair of hinged sections adapted to be removably secured to the pipe, a pinion, a motor, means drivingly connecting said motor and said pinion, said pinion being in mesh with said gear, and means including flanges on one of said gears contacting the faces of the other of said gears for preventing said gears from separating from each other when one is moved with respect to the other in a direction parallel to the axis of rotation of said pinion.

4. The apparatus of claim 3 together with means for releasably latching the confronting ends of said hinged sections in order to hold said gear onto the pipe.

5. In a pipe handling apparatus which includes pipe holders, and rails on which said pipe holders are mounted, the improvement comprising a carriage mounted on said rails for movement parallel to said rails, a motor carried by said carriage and having a motor shaft, a first gear secured to said motor shaft and movable with said carriage when said carriage is adjusted on said rails, a second gear, means operatively connected with said second gear for attaching said second gear to the pipe, said gears being enmeshed so as to establish a drive connection between the motor and the pipe, and one of said gears having a lateral flange along the ends of the teeth thereof in order to prevent said gears from becoming separated from each other in response to movement of said carriage on said rails.

References Cited in the file of this patent

UNITED STATES PATENTS

| | | |
|---|---|---|
| 563,939 | McBride | July 14, 1896 |
| 853,387 | Walker | May 14, 1907 |
| 1,323,127 | Treuthardt | Nov. 25, 1919 |
| 1,751,510 | Cunningham | Mar. 25, 1930 |
| 1,992,812 | Chapman | Feb. 26, 1935 |
| 2,730,796 | Menser | Jan. 17, 1956 |